(12) United States Patent
Singh et al.

(10) Patent No.: US 11,573,478 B2
(45) Date of Patent: Feb. 7, 2023

(54) METHOD AND SYSTEM FOR GENERATING INTENSE, ULTRASHORT PULSES OF XUV AND SOFT X-RAY RADIATION VIA HHG

(71) Applicant: INSTITUT NATIONAL DE LA RECHERCHE SCIENTIFIQUE, Quebec (CA)

(72) Inventors: Mangaljit Singh, Montreal (CA); Tsuneyuki Ozaki, Brossard (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 253 days.

(21) Appl. No.: 17/110,964

(22) Filed: Dec. 3, 2020

(65) Prior Publication Data

US 2021/0173283 A1 Jun. 10, 2021

Related U.S. Application Data (60) Provisional application No. 62/943,327, filed on Dec. 4, 2019.

(51) Int. Cl.
*G02F 1/35* (2006.01)
*G02F 1/37* (2006.01)
(Continued)

(52) U.S. Cl.
CPC .......... *G02F 1/3507* (2021.01); *G02F 1/3503* (2021.01); *G02F 1/354* (2021.01);
(Continued)

(58) Field of Classification Search
CPC ...... G02F 1/3503; G02F 1/3507; G02F 1/354; G02F 1/3551; H01S 3/0057; H01S 3/1625; H01S 3/1636; H05G 2/00
See application file for complete search history.

(56) References Cited

U.S. PATENT DOCUMENTS 10,128,631 B2 * 11/2018 Popmintchev ............ H01S 4/00
2021/0063329 A1 * 3/2021 Kuznetsov ............ G01N 23/205

FOREIGN PATENT DOCUMENTS

WO WO-2004044648 A1 * 5/2004 ............ G02F 1/353
WO WO-2018155526 A1 * 8/2018 ............ G01N 27/62

OTHER PUBLICATIONS

Brabec, T. & Krausz, F. Intense few-cycle laser fields: Frontiers of nonlinear optics. Rev. Mod. Phys. 72, 545-591 (2000).
(Continued)

*Primary Examiner* — Daniel Petkovsek
(74) *Attorney, Agent, or Firm* — Lavery, De Billy, LLP; Gwendoline Bruneau (57) ABSTRACT

A method and a system for generating intense, ultrashort pulses of XUV and soft X-ray radiation via high-order harmonic generation (HHG), the method comprising selecting a nonlinear solid target and a laser source; separating a beam from the laser source into a first laser beam and a second laser beam; focusing the first laser beam onto the nonlinear solid target, thereby generating a laser ablated plume; and compressing and frequency-doubling the second laser beam and directing a resulting second compressed and frequency-doubled laser beam to the laser ablated plume, thereby yielding high-order harmonic generation of radiation of photon energies in a range between 12 eV and 36 eV. A high-order harmonic source of radiation, comprising a nonlinear solid target; a laser source; a beam splitter separating a beam from the laser source into a first beam line and a second beam line; the first beam line comprising a first focusing unit directing a first, uncompressed, laser beam onto the nonlinear solid target, to generate a laser ablated plume; and the second beam line directing a second, compressed and frequency-doubled laser beam, to the laser ablated plume, yielding high-order harmonic generation of
(Continued)

radiation of photon energies in a range between 12 eV and 36 eV.

14 Claims, 5 Drawing Sheets

(51) Int. Cl.
    G02F 1/355    (2006.01)
    H01S 3/16    (2006.01)
    H05G 2/00    (2006.01)
    H01S 3/00    (2006.01)

(52) U.S. Cl.
    CPC .............. *G02F 1/3551* (2013.01); *G02F 1/37* (2013.01); *H01S 3/0057* (2013.01); *H01S 3/1625* (2013.01); *H01S 3/1636* (2013.01); *H05G 2/00* (2013.01)

(56) References Cited

OTHER PUBLICATIONS

Lewenstein, M. & L'Huillier, A. Principles of Single Atom Physics: High-Order Harmonic Generation, Above-Threshold onization and Non-Sequential Ionization, in 147-183 (Springer, New York, NY, 2008). doi:1 0.1007/978-0-387-34755-4_7.
Ibrahim, H. et al. Tabletop imaging of structural evolutions in chemical reactions demonstrated for the acetylene cation. Nat. Commun 5, 4422 (2014).
Kapteyn, H. C., Da Silva, L. B. & Falcone, R. W. Short-wavelength lasers. Proc. IEEE 80, 342-347 (1992).
Kelkensberg, F. et al. Molecular Dissociative Ionization and Wave-Packet Dynamics Studied Using Two-Color XUV and IR Pump-Probe Spectroscopy. Phys. Rev. Lett. 103, 123005 (2009).
Goulielmakis, E. et al. Attosecond Control and Measurement: Lightwave Electronics. Science (80-.). 317, (2007).
Hughey, L. R., Williams, R. T., Rife, J. C., Nagel, D. J. & Peckerar, M. C. Instrumentation for XUV lithography at Surf-II. Nucl. Instruments Methods Phys. Res. 195, 267-271 (1982).
Rothhardt, J., Tadesse, G. K., Eschen, W. & Limpert, J. Table-top nanoscale coherent imaging with XUV light. J. Opt. 20, 113001 (2018).
Damascelli, A. Probing the Electronic Structure of Complex Systems by ARPES. Phys. Scr. T109, 61 (2004).
He, Y. et al. Invited Article: High resolution angle resolved photoemission with tabletop 11 eV laser. Rev. Sci. Instrum. 87, 011301 (2016).
Schmidt, O. et al. Time-resolved two photon photoemission electron microscopy. Appl. Phys. B 74, 223-227 (2002).
Miao, J. et al. High Resolution 3D X-Ray Diffraction Microscopy. Phys. Rev. Lett. 89, 088303 (2002).
Thibault, P. et al. High-resolution scanning x-ray diffraction microscopy. Science 321, 379-82 (2008).
Winterfeldt, C., Spielmann, C. & Gerber, G. Colloquium: Optimal control of high-harmonic generation. Rev. Mod. Phys. 80, 117-140 (2008).
Corkum, P. B. Plasma perspective on strong field multiphoton ionization. Phys. Rev. Lett. 71, 1994-1997 (1993).
Seddon, E. A. et al. Short-wavelength free-electron laser sources and science: a review. Reports Prog. Phys. 80, 115901 (2017).
Schnürer, M. et al. Absorption-Limited Generation of Coherent Ultrashort Soft-X-Ray Pulses. Phys. Rev. Lett. 83, 722-725 (1999).
Seres, J. et al. Source of coherent kiloelectronvolt X-rays. Nature 433, 596-596 (2005).
Ditmire, T., Crane, J. K., Nguyen, H., DaSilva, L. B. & Perry, M. D. Energy-yield and conversion-efficiency measurements of high-order harmonic radiation. Phys. Rev. A 51, R902-R905 (1995).
Constant, E. et al. Optimizing High Harmonic Generation in Absorbing Gases: Model and Experiment. Phys. Rev. Lett. 82, 1668-1671 (1999).
Dachraoui, H. et al. Interplay between absorption, dispersion and refraction in high-order harmonic generation. J. Phys B At. Mol. Opt. Phys. 42, 175402 (2009).
Seres, J. et al. Coherent superposition of laser-driven soft-X-ray harmonics from successive sources. Nat. Phys. 3, 878-883 (2007).
Paul, A. et al. Quasi-phase-matched generation of coherent extreme-ultraviolet light. Nature 421, 51-54 (2003).
Lambert, G. et al. Injection of harmonics generated in gas in a free-electron laser providing intense and coherent extreme-ultraviolet light Nat Phys 4, 296-300 (2008).
De Stasio, G. et al. Feasibility tests of transmission x-ray photoelectron emission microscopy of wet samples. Rev. Sci. Instrum. 71, 11-14(2000).
Lambert, G. et al. Seed level requirement for improving the temporal coherence of a Free-Electron Laser. EPL (Europhysics Lett. 88, 54002 (2009).
Ozaki, T., Ganeev, R., Suzuki, M. & Kuro, H. High-Order Harmonic Generation from Low-Density Plasma, in Advances in Solid State Lasers Development and Applications (InTech, 2010). doi:10.5772/7963.
Ganeev, R. A. Harmonic generation in laser-produced plasmas containing atoms, ions and clusters: a review. J. Mod. Opt. 59, 409-439 (2012).
Suzuki, M., Baba, M., Ganeev, R., Kuroda, H. & Ozaki, T. Anomalous enhancement of a single high-order harmonic by using a laser-ablation tin plume at 47 nm. Opt. Lett. 31, 3306 (2006).
Ganeev, R. A., Suzuki, M., Baba, M., Kuroda, H. & Ozaki, T. Strong resonance enhancement of a single harmonic generated in the extreme ultraviolet range. Opt. Lett 31, 1699 (2006).
Peart, B., Lyon, I. C. & Dolder, K. Measurements of absolute photoionisation cross sections of Ga + and Zn + ions. J. Phys. B At. Mol. Phys. 20, 5403-5410 (1987).
Zeitoun, P. et al. A high-intensity highly coherent soft X-ray femtosecond laser seeded by a high harmonic beam. Nature 431, 426-429 (2004).
Duffy, G., Kampen, P. van & Dunne, P. 4d→5p transitions in the extreme ultraviolet photoabsorption spectra of Sn II and Sn III. J. Phys. B At. Mol. Opt. Phys. 34, 3171-3178 (2001).
Duffy, G. & Dunne, P. The photoabsorption spectrum of an indium laser produced plasma. J. Phys. B At. Mol. Opt. Phys. 34, L173-L178 (2001).
Ganeev, R. A., Elouga Bom, L. B. & Ozaki, T. High-order harmonic generation from plasma plume pumped by 400nm wavelength laser. Appl. Phys. Lett. 91, 131104 (2007).
Ganeev, R. A. et al. Isolated sub-fs XUV pulse generation in Mn plasma ablation. Opt. Express 20, 25239 (2012).
Ganeev, R. A., Naik, P. A., Singhal, H., Chakera, J. A. & Gupta, P. D. Strong enhancement and extinction of single harmonic intensity in the mid- and end-plateau regions of the high harmonics generated in weakly excited laser plasmas. Opt. Lett. 32, 65 (2007).
Strelkov, V. Role of autoionizing state in resonant high-order harmonic generation and attosecond pulse production. Phys. Rev. Lett. 104, 123901 (2010).

\* cited by examiner

FIG. 5

METHOD AND SYSTEM FOR GENERATING INTENSE, ULTRASHORT PULSES OF XUV AND SOFT X-RAY RADIATION VIA HHG

CROSS REFERENCE TO RELATED APPLICATIONS

This application claims benefit of U.S. provisional application Ser. No. 62/943,327 filed on Dec. 4, 2019. All documents above are incorporated herein in their entirety by reference.

FIELD OF THE INVENTION

The present invention relates to extreme ultraviolet (XUV) and soft X-ray radiation. More specifically, the present disclosure is concerned with a method and a system for generating intense, ultrashort pulses of XUV and soft X-ray radiation via high-order harmonic generation (HHG).

BACKGROUND OF THE INVENTION

The invention of the laser may be considered as one of the most important scientific breakthroughs of the 20th century. Lasers have unique characteristics, such as spatial and temporal coherence, directionality, monochromaticity and high intensity. Applications of laser light have resulted in groundbreaking developments in a range of fields, including for example medicine, quantum physics and spectroscopy, communication, laser printing and the entertainment industry in the form of CDs-DVDs for instance. Recent breakthroughs occurred with the development of pulsed lasers with durations as short as a few femtoseconds (fs), resulting in light wave packets containing only a few oscillations of the electromagnetic field [1]. By focusing such laser pulses, these light fields confined to such short temporal duration can create intensities as high as $10^{15}$ W cm$^{-2}$ using pulse energy of only 1 mJ. The intensities are high enough to suppress the Coulomb forces that bind atoms and molecules together and hence enable the study of the physics underlying atomic and molecular ionizations [2]. Ultrashort laser pulse durations also allow temporally resolved studies of the ultrafast dynamics of a range of atomic and molecular phenomenon [3].

Due to several limitations such as reduced stimulated emission cross-section, decreased lifetime of the energy levels of a given laser active medium and increased energy level broadening effects at shorter wavelengths, imposed by the fundamental physics of lasers, most commercially available lasers operate only in the visible or in the longer wavelength region of the electromagnetic spectrum. Population inversion, which is an essential requirement for the laser to operate, decreases rapidly with decreasing laser wavelength λ, scaling as $\lambda^{-4}$ to $\lambda^{-6}$ [4]. This results in drastically inefficient laser systems for shorter wavelengths, which has discouraged efforts to commercialize such systems.

Sources emitting laser-like radiation in the short wavelength regions, especially in the extreme ultraviolet (XUV) and soft X-ray radiation are still being investigated, in view of applications such as XUV pump-probe spectroscopy [5], intense attosecond pulses [6], XUV lithography [7], coherent nanoscale imaging [8], time-resolved photoemission spectroscopy (ARPES, PEEM) [9,10,11] and X-ray microscopy [12,13] for example.

High-order harmonic generation (HHG) from noble gases with excellent coherence and spatial profiles has successfully been demonstrated for extreme ultraviolet (XUV) or high-energy ultraviolet radiation in the part of the electromagnetic spectrum spanning photon energies from 10 eV to 200 eV, and therefore having the wavelength from 124 nm down to 6.2 nm respectively, and soft X-ray radiation, i.e. with photon energies from 200 eV to 10 keV, and therefore having the wavelength from 6.2 nm down to 0.12 nm respectively. Free-electron lasers (FELs) are other ultrashort XUV and soft X-ray sources. In a free-electron laser (FEL), a synchrotron radiation is generated by spontaneous emission, as a beam of electrons passes through a magnetic structure referred to as an undulator or wiggler, which is subsequently amplified through self-amplified spontaneous emission (SASE) [16].

Both high-order harmonic generation (HHG) and free-electron laser (FEL) radiation sources have critical limitations. On the one hand, since high-order harmonic generation (HHG) is a highly nonlinear and non-perturbative process, its conversion efficiency (CE) is extremely low, typically in the range between $10^{-8}$ and $10^{-6}$ for various noble gases generating only nanojoule (nJ) values of extreme ultraviolet (XUV) pulse energies [17]. Such low-efficiency results in limited applicability of such a source for potential applications. On the other hand, the free-electron laser (FEL) is a large-scale facility of limited widespread accessibility. Moreover, partial coherence property of free-electron laser (FEL) radiation resulting from self-amplified spontaneous emission (SASE) may be a limitation. Moreover, X-rays from both high-order harmonic generation (HHG) and free-electron laser (FEL) have extremely broad bandwidth, which may be a limitation in applications when monochromaticity is required, such as in photoemission spectroscopy and X-ray microscopy for example. For instance, using a 5 fs, 720 nm, 0.2 TW laser, a continuum of high-order harmonics extending up to 1.3 keV may be achieved [18], but for applications requiring monochromatic X-rays, X-ray pulses from high-order harmonic generation (HHG) and free-electron laser (FEL) are passed through a monochromator, which reduces the intensity and brilliance of the X-ray pulse typically by at least 70%.

The low extreme ultraviolet (XUV) photon flux of the high-order harmonic generation (HHG) process due to its limited conversion efficiency (CE) has been an issue. Attempts have been made to increase the number of atoms/ions in a nonlinear media emitting the XUV and soft X-ray radiation. For example, using a focusing geometry having a very long focal length f, typically in a range between 500 and 1000 cm [19, 20], may be used to increase the focal spot size of the driving ultrafast laser field onto the nonlinear media. The increased focal spot size creates a larger volume of atoms/ions interacting with the laser beam, thereby coherently building up the XUV and soft X-ray radiation inside the nonlinear media. The use of long focal length also reduces the phase mismatch between the driving laser beam and the high-order harmonic by minimizing the geometrical phase-shift, also known as the Gouy phase, experienced by the driving laser beam when passing through the nonlinear media [21]. Other attempts include optimizing the length of the nonlinear media to minimize reabsorption, or using complicated nonlinear media geometry in quasi-phase-matching technique utilizing coherent buildup of XUV and soft X-ray generation from multiple nonlinear high-order harmonic generation (HHG) sources, for example [22,23].

Injection of an external coherent extreme ultraviolet (XUV) or soft X-ray seed beam produced by high-order harmonic generation (HHG) into the free-electron laser (FEL) is used to improve the coherence properties of free-electron laser (FEL) [24]. The synchrotron radiation produced by the wiggling electron beam in a free-electron laser (FEL) interacts with the electron beam through energy exchange along the undulator, which modulates the electron bunch density in the longitudinal direction, with a period close to the wavelength of the spontaneous emission. The partial temporal coherence of the free-electron laser (FEL) radiation occurs due to electron density bunching taking place independently in the different parts of the bunch [16]. Seeding from an external coherent source accelerates the pace of the electron bunching process as compared to self-amplified spontaneous emission (SASE), hence improving the coherence properties of free-electron laser (FEL) radiation. Furthermore, external seed allows saturation gain values over shorter lengths of the undulator as compared to self-amplified spontaneous emission (SASE), allowing for compact systems and reduced cost of systems building and maintenance. Seeded free-electron laser (FEL) configuration allows improvements in the time jitter of free-electron laser (FEL) pulses, crucial for time-resolved pump-probe experiments [24]. Seeding also allows extending the free electron laser (FEL) spectral gain width, which is inversely proportional to the number of undulator periods, hence further pushing down the temporal duration values of the free-electron laser (FEL) radiation [24].

X-ray monochromators may be used to slice out a narrow spectrum from these ultra-broadband X-ray pulses to improve the monochromaticity of X-ray pulses generated via high-order harmonic generation (HHG) and free-electron laser (FEL). Such X-ray flux monochromators use grazing incidence gratings and Bragg crystals.

Increasing the extreme ultraviolet (XUV) and soft X-ray flux from high-order harmonic generation (HHG) through reducing the geometrical phase-shift mismatching by using long focal length focusing geometry requires very high laser pulse energies to achieve the desired laser intensities in the interaction region of the nonlinear media to generate high-order harmonics. For example, at a fixed pulse duration, driving laser wavelength and laser beam diameter, it would require 20 times higher laser pulse energy to achieve the same laser intensity at the focus with long 700 cm focal length lens as compared to the pulse energy required with shorter 150 cm focal length. Thus, a laser system with multiple amplification stages is required to achieve the desired laser power, resulting into an increased system cost. The use of multiple amplification stages deteriorates the spatial and temporal properties of the laser pulses, which in turn affects the properties of the generated harmonics. Other optimization methods based on specially designed target configurations reducing reabsorption and improving the phase-matching require intricate design procedures, and result in complex, less user-friendly, systems.

Moreover, to operate a free-electron laser (FEL) at shorter wavelength range, especially in the water-window in the range between 2.3 nm and 4.4 nm having high transmission by water but strong absorption by carbon, thereby finding a wide range of applications in the imaging of biological materials in their natural hydrated state [25], shorter seed wavelengths are required as compared to a typical 3rd-5th harmonic of Ti:sapphire 800 nm laser typically used for the seeding [26]. In such a case, the limited photon flux of high-order harmonic generation (HHG), which drastically reduces with increasing orders, may not be sufficient to surpass the initiating SE incoherent radiation.

Also, improving the monochromaticity of X-ray pulses using grazing incidence gratings and Bragg crystals is inefficient since these dispersive X-ray optics have limited efficiency. As such, the brightness of these X-rays is typically reduced by at least 70%.

There is still a need in the art for a method and a system for generating intense, ultrashort pulses of extreme ultraviolet (XUV) and soft X-ray radiation via high-order harmonic generation (HHG).

SUMMARY OF THE INVENTION

More specifically, in accordance with the present invention, there is provided a high-order harmonic source of radiation, comprising a nonlinear solid target; a laser source; a beam splitter separating a beam from the laser source into a first beam line and a second beam line; the first beam line comprising a first focusing unit directing a first, uncompressed, laser beam onto the nonlinear solid target, to generate a laser ablated plume; and the second beam line directing a second, compressed and frequency-doubled laser beam, to the laser ablated plume, yielding high-order harmonic generation of radiation of photon energies in a range between 12 eV and 36 eV.

There is further provided a system for generating radiation, comprising a nonlinear solid target; a laser source of a wavelength selected to achieve a multiphoton resonance with a target resonant transition energy in the solid target for resonant harmonic generation; a beam splitter separating a beam from the laser source into a first beam and a second beam; a first focusing unit and a second focusing unit; a compressor; a frequency-doubling unit; wherein the first beam is directed onto the nonlinear solid target by the first focusing unit, thereby generating a laser ablated plume; the compressor compresses pulses of the second beam and resulting compressed second beam pulses are directed by the second focusing unit to the frequency-doubling unit and to the laser ablated plume, yielding high-order harmonic generation of radiation of photon energies in a range between 12 eV and 36 eV.

There is further provided a method for generation of radiation via high-order harmonic generation, comprising selecting a nonlinear solid target and a laser source; separating a beam from the laser source into a first laser beam and a second laser beam; focusing the first laser beam onto the nonlinear solid target, thereby generating a laser ablated plume; and compressing and frequency-doubling the second laser beam and directing a resulting second compressed and frequency-doubled laser beam to the laser ablated plume, thereby yielding high-order harmonic generation of radiation of photon energies in a range between 12 eV and 36 eV.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

In the present disclosure, high-order harmonic generation (HHG) from laser ablated plume (LAP) is used as a source of radiation with a photon energy in the range between about 12 eV and about 36 eV, corresponding to a wavelength range between about 103 nm down to about 34 nm respectively (see FIG. 5 discussed hereinbelow).

A highly nonlinear process takes place between a laser pulse and a laser ablated plume (LAP). The laser pulse is an intense ultrashort pulse, of intensity in a range between about $10^{13}$ and about $10^{14}$ W cm$^2$ and pulse duration in a range between about 10 and about 100 fs. The laser ablated plume (LAP) is created by focusing a driving laser beam of picosecond pulse (ps), in a range between about 100 and about 500 ps, onto a nonlinear solid target surface.

Figure 1:
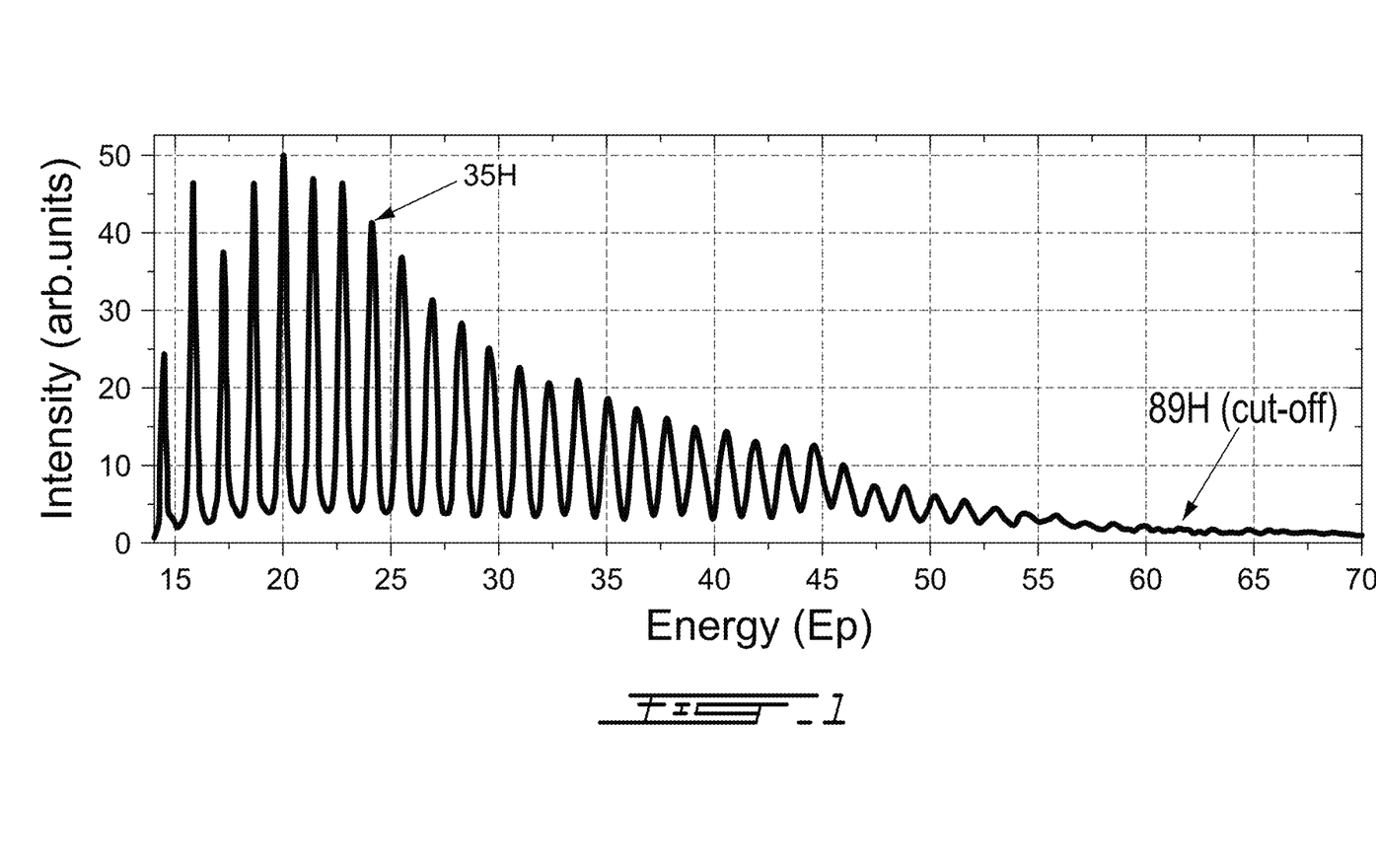
FIG. 1 shows a typical high-order harmonic generation (HHG) spectrum.

A typical high-order harmonic generation (HHG) spectrum generated by the driving laser photon of energy $E_O$ contains spikes/harmonics, referred to as harmonic orders, of energy $E_p$, with $E_p=n \times E_0$ where n is an odd integer. As shown in FIG. 1, the high harmonics decrease in intensity at low orders to a plateau in which the intensity of the harmonics remain approximately constant over many orders until a position of the harmonic cut-off. In FIG. 1, 35H denotes the 35$^{th}$ harmonic order of photon energy $35 \times E_0$ and the harmonic cut-off is the maximum harmonic order 89H [14].

Figure 2:
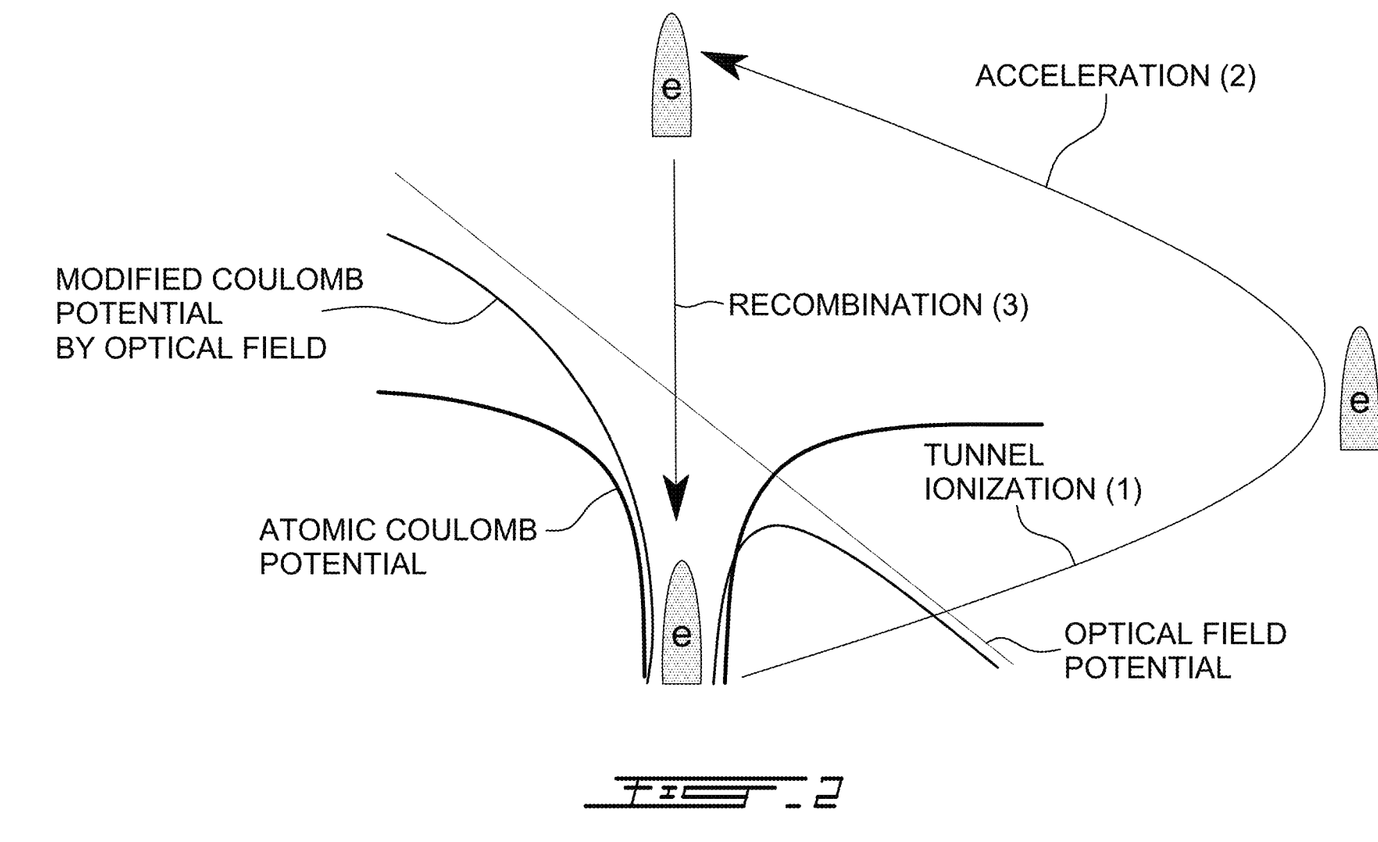
FIG. 2 is a schematic diagram of the three-step model of high-order harmonic generation (HHG) from laser ablated plume (LAP)

High-order harmonic generation (HHG) from laser ablated plume (LAP) may be explained by a semi-classical three-step model, as schematically illustrated in FIG. 2. The high strength electric field of the driving laser pulse, comprised in a range between about 0.6 and about 3.0 V Å$^{-1}$, suppresses the Coulomb potential holding the valence shell electron of the atom/ion system of the nonlinear medium, causing the electron to tunnel out of the atomic system (1). The tunnel-ionized electron is accelerated away from the parent ion by the electric field of the driving laser pulse (2); and, upon reversal of the electric field of the driving laser pulse, the tunnel ionized electron recombines into the initial ground state of the parent ion (3), thereby emitting high energy photon, with energies up to keV, in the range between about 200 eV and about 1.3 keV in highly phase-matched conditions [18], hence high-order harmonics. The harmonic cut-off energy is the sum of the ionization potential ($I_p$) of the generating atomic/ionic species in the laser ablated plume (LAP) and the kinetic energy of the tunnel-ionized electron at the moment of recombination (step 3).

Figure 3A:
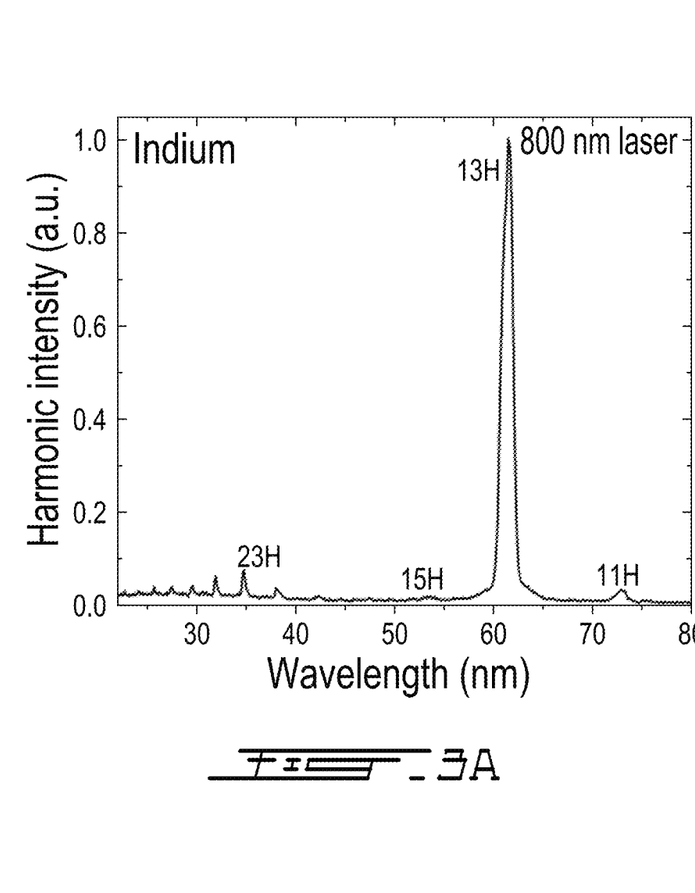
FIG. 3A shows a high-order harmonic generation (HHG) spectrum from indium laser ablated plume (LAP) showing enhanced resonant harmonic (RH)
Figure 3B:
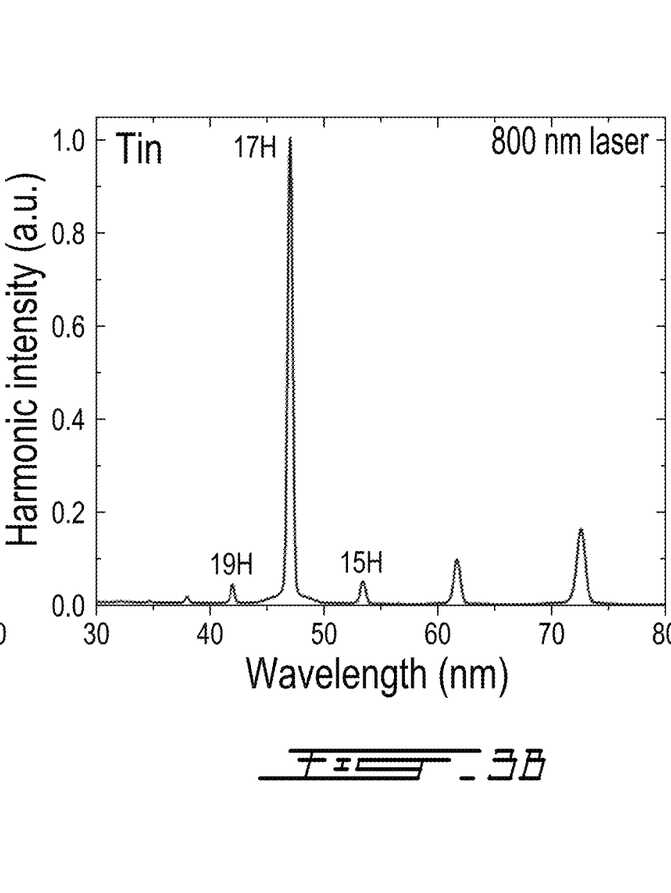
FIG. 3B shows a high-order harmonic generation (HHG) spectrum from tin laser ablated plume (LAP) showing enhanced resonant harmonic (RH)

During high-order harmonic generation (HHG) from many laser-ablated plumes (LAPs), it is typically observed that the intensity of one harmonic order is abnormally larger than the neighboring harmonics [30]. This phenomenon is known as resonantly enhanced high harmonics generation (HHG), and the corresponding harmonic is known as the resonant harmonic (RH). For example, in the case of indium laser ablated plume (LAP) as shown in FIG. 3A, the resonant harmonic (RH) is observed at 61.5 nm, which corresponds to the 13th harmonic order 13H with a 800 nm driving laser wavelength, of harmonic intensity two orders of magnitude higher than the intensity of the neighboring harmonics. Such enhancement is observed in tin laser ablated plume (LAP) at 47 nm, which corresponds to the 17th harmonic order 17H with a 800 nm driving laser wavelength (see FIG. 3B) [29]. Careful investigations revealed that the singly charged species of both tin and indium exhibit a strong electronic transition with a high oscillator strength close to the wavelength of the resonant harmonic (RH). For example, the Sn$^+$ ion possesses a transition $4d^{10}\ 5s^2\ 5p^2P_{3/2} \rightarrow 4d^9\ 5s^2\ 5p^2\ (^1D)^2D_{5/2}$ at 26.27 eV (47.2 nm) with a high oscillator strength of 1.52, and the In$^+$ ion also possesses a transition $4d^{10}\ 5s^2\ ^1S_0 \rightarrow 4d^9\ 5s^2\ 5p\ (^2D)^1P_{1/2}$ at 19.92 eV (about 62.24 nm) with a high oscillator strength of 1.11. The resonant harmonics (RH) of tin and indium are capable of generating bright harmonics of harmonic energies in the range of µJ, for example 1.1 µJ from tin laser ablated plume (LAP). Other materials that also show the phenomenon of resonant harmonic (RH) are chromium, manganese, and antimony for example.

High-order harmonic generation (HHG) from laser ablated plume (LAP) is created by focusing a second laser beam onto a solid nonlinear media for high-order harmonic generation (HHG) [27] from laser ablated plume (LAP). As a result of the phenomenon of resonant harmonic (RH), the intensity enhancement of a harmonic by more than two-orders of magnitude as compared to the neighbouring harmonics[28] discussed hereinabove is obtained. The resonant harmonic (RH) results in extremely high photon flux, e.g. the emission of the resonant harmonic (RH) from tin for example with a resonance close to 47 nm using a 800 nm driving laser wavelength, with an enhancement factor of 20 and results in the emission of about 1.1 µJ harmonic energy with a high conversion efficiency (CE) of $10^{-4}$.[29]. Other elements of interest include indium, with a resonance close to 61.5 nm, for which using a 800 nm driving laser wavelength results in an enhancement factor of almost two-orders, resulting in the emission of about 0.8 µJ harmonic energy with a high conversion efficiency (CE) of $0.8 \times 10^{-4}$.[30]

In experiments illustrated and discussed herein, Gallium was selected as a target element creating the laser ablated plume (LAP). Gallium has a resonance close to 56.6 nm, and shorter-wavelength 400 nm laser pulses were used to generate the resonant harmonic (RH).[31]. It was found that the enhancement factor is even higher than when using Indium using shorter driving laser wavelength and an enhancement factor of 670 was obtained. This increase in the enhancement factor results in a high-order harmonic source with enhanced monochromaticity and intensity, as will be discussed hereinbelow.

Figure 4:
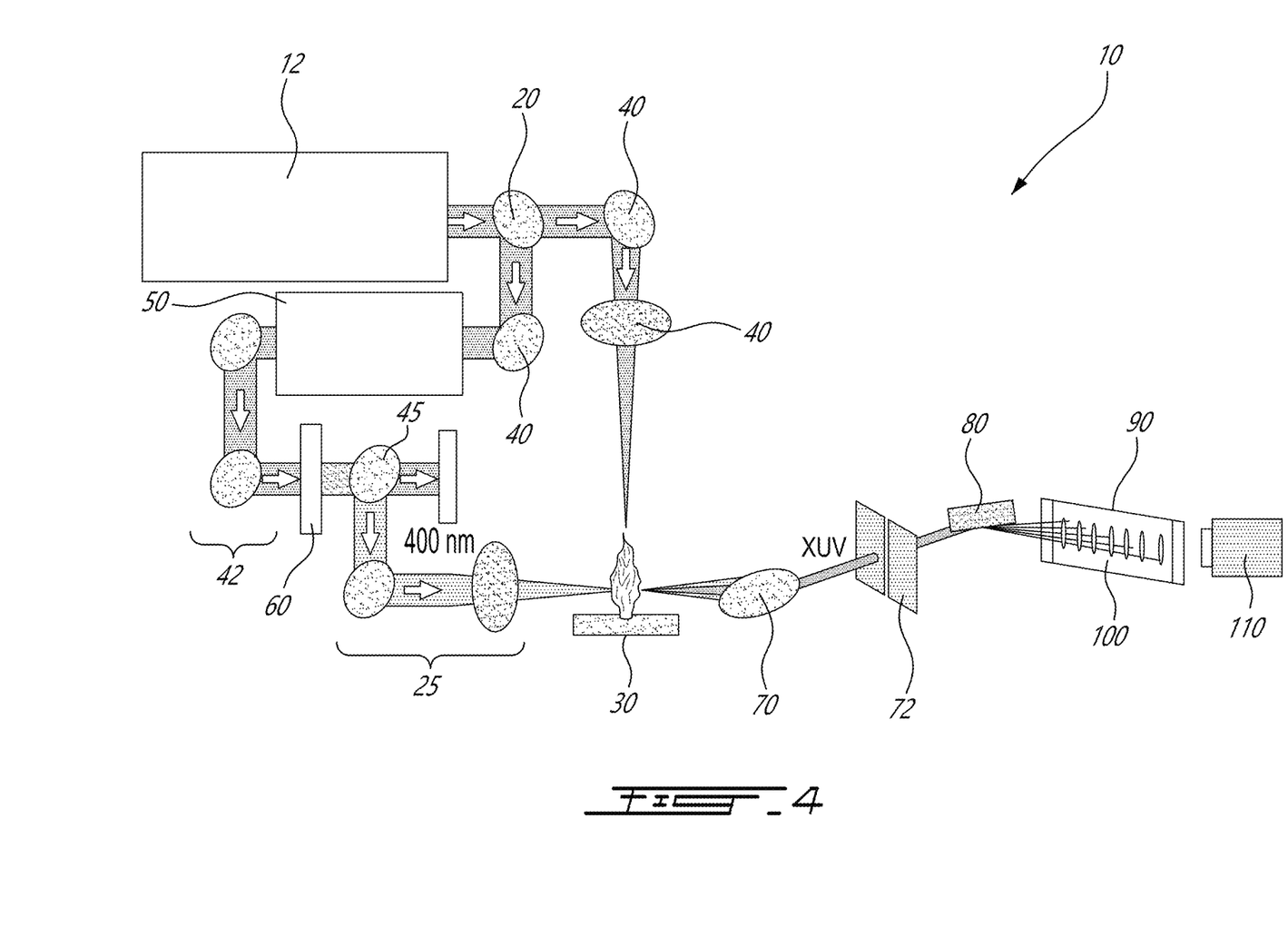
FIG. 4 is a schematic of a system according to an embodiment of an aspect of the present disclosure.

A system 10 according to an embodiment of an aspect of the present disclosure as illustrated in FIG. 4 comprises a solid target 30 placed in a vacuum 30 and a driving laser 12 selected in relation to the response of a laser ablated plume (LAP) from the solid target towards the target high-order harmonic generation (HHG).

The solid target 30 may be graphite, tin, indium, manganese, chromium, gallium, or antimony for example. The vacuum is typically comprised in a range between about $10^{-5}$ and about $10^{-6}$ torr.

In experiments discussed herein, the target 30 is Gallium and the driving laser 12 is an amplified Ti:sapphire laser of wavelength 800 nm, 210 ps uncompressed laser pulse duration, 50 fs compressed laser pulse duration and a 10 Hz pulse repetition rate was used.

The driving laser beam is split by a beam splitter 20 into a first beam, representing about 30% part, for providing a required pulse energy in a range between about 1.0 and about 2.0 mJ of the ps driving laser pulses, and a second beam.

The first driving laser beam, uncompressed, is focused by a mirror and lens combination 40 onto the solid Gallium target 30, mounted onto an XYZ translation stage (not shown) in a vacuum of about $10^{-5}$ Torr, at an intensity in a range between about $0.5 \times 10^{10}$ and about $3.0 \times 10^{10}$ W cm$^{-2}$, for example of about $1.0 \times 10^{10}$ W cm$^{-2}$, for generating a laser ablated plume (LAP).

The second laser beam is directed to a grating compressor 50 to temporally compress the 210 ps laser pulses to a range between about 45 and about 60 fs, for example of about 50 fs, and then sent by mirrors 42 to a barium borate (BBO) crystal 60 for second harmonic generation (frequency doubling) of the 800 nm driving laser wavelength. Resulting 400 nm driving laser pulses with a 57 fs pulse duration are directed by a mirror and lens combination 25 to the laser ablated plume (LAP) generated by the interaction of the uncompressed ps laser pulses with the solid Gallium target 30, to generate the high-order harmonic spectrum from the gallium laser ablated plume (LAP), of an intensity in a range between about $0.5 \times 10^{14}$ and about $4.0 \times 10^{14}$ W cm$^{-2}$, for example of about $1.0 \times 10^{14}$ W cm$^{-2}$.

Thus, the second harmonic generation (frequency doubling) of the 800 nm driving laser wavelength performed using the BBO crystal 60 generates the 400 nm laser pulses with the 57 fs pulse duration, which are used to generate the high-order harmonic spectrum from the gallium laser ablated plume (LAP).

To generate the resonant harmonic (RH), the driving laser wavelength of operation is selected so as to achieve the multiphoton resonance with the target resonant transition energy of relatively low order (seven or less) to be perturbed in said laser ablated plume for resonant harmonic generation. The resonant transition $3d^{10} 4s^2 \rightarrow 3d^9 4s^2 4p^3 P_1$ of Ga$^+$ is at 21.9 eV, which is 7-photon resonant with a 400 nm driving laser wavelength, i.e. with the driving laser photon energy of 3.1 eV, and hence the criteria for the selection of laser wavelength. To avoid the complete ground state depletion of Ga$^+$ before the laser peak intensity, and hence for efficient high-order harmonic generation, the driving laser compressed pulse duration is selected on the scale of fs, typically in the range between about 10 and about 100 fs. The selection of laser repetition rate depends on the requirement of the driving laser pulse energies. In experiments discussed herein for example, a driving laser pulse energy between about 1.0 and about 2.0 mJ is required, which is typically provided by laser systems with laser repetition rates in the range between about 10 and about 100 Hz. Higher values of laser repetition rate result into lower values of laser pulse energies, for example nanojoule (nJ) level laser pulse energies generated from most commercially available megahertz (MHz) repetition rate laser systems.

A silicon mirror 70 at a Brewster angle is used to eliminate the fundamental driving laser beam while reflecting the generated radiation beam. The generated radiation beam is then passed through a fixed vertical slit 72 of an opening size in a range between about 40 and about 100 µm. The generated radiation beam is spectrally dispersed by a flat-field grating 80 (Hitachi, 1200 lines/mm), and is detected by a microchannel plate 90 and a phosphor screen 100, then recorded by a CMOS camera 110 (model PCO-edge, PCO AG, Germany).

Figure 5:
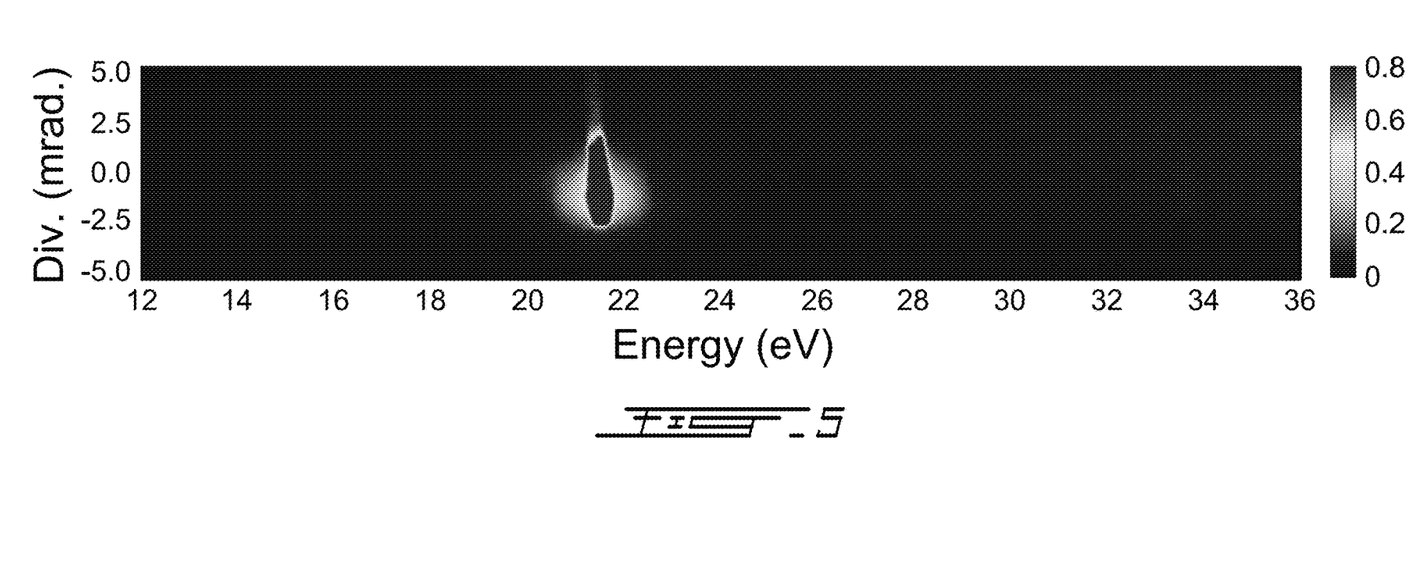
FIG. 5 shows a high-order harmonic generation (HHG) spectrum generated from gallium laser ablated plume (LAP) according to an embodiment of an aspect of the present disclosure, 45 referring to a dichroic mirror.

As shown in FIG. 5, a very intense resonant harmonic (RH) is observed at about 21.9 eV (56.62 nm) with an enhancement factor of about 670. This result is the first observation of resonant harmonic (RH) in Gallium; the enhancement factor (670) is increased compared to Indium using a shorter driving laser wavelength (value of enhancement factor of 117 in experiments).

Thus, the system provides a high-order harmonic source with unparalleled monochromaticity (value of enhancement ratio of 670) and intensity (in a range between about $10^{14}$ and about $10^{15}$ W cm$^{-2}$ when focused using a focusing optics of focal length in the range between about 50 and about 100 cm).

The present system allows to concentrate X-rays to a specific wavelength range. Also, the high-order harmonic photon flux, i.e. the photon flux in the harmonic generation process, is enhanced at the atomic level.

The present disclosure presents a method and a system to generate intense, ultrashort pulses of extreme ultraviolet (XUV) and soft X-ray radiation via high-order harmonic generation (HHG), using driving lasers with reduced wavelengths, which results in an increase of the resonant enhancement factor of the resonant harmonic (RH), thereby increasing the monochromaticity of the generated harmonics, as well as an increase in harmonic intensity. These two effects combined result in a high-order harmonic source with unparalleled monochromaticity and extremely high intensity and conversion efficiency (CE).

HHG from laser ablated plume (LAP) differs from high-order harmonic generation (HHG) from gases in the use of an ablation plume, created by focusing a driving laser beam onto a solid target, instead of gas as the nonlinear media for high-order harmonic generation (HHG) [27]. It was determined that the one phenomenon that makes high-order harmonic generation (HHG) from laser ablated plume (LAP) very distinct when compared with the high-order harmonic generation (HHG) from gases is the phenomenon of resonant harmonics (RH), which involves the intensity enhancement of a harmonic by more than two-orders of magnitude as compared to the neighboring harmonics [28]. The resonant harmonic (RH) results in extremely high photon flux, e.g. the emission of the resonant harmonic (RH) from tin with a resonance close to 47 nm using 800 nm driving laser wavelength shows an enhancement factor of 20 and results in the emission of about 1.1 µJ harmonic energy with a high conversion efficiency (CE) of $10^{-4}$ [29].

Similarly, another interesting element is Indium, which has a resonance close to 61.5 nm and using 800 nm driving laser wavelength shows an enhancement factor of almost two-orders, resulting in the emission of about 0.8 µJ harmonic energy with a high conversion efficiency (CE) of $0.8 \times 10^{-4}$ [30].

The present monochromatic high-order harmonic generation (HHG) source may operate with a driving laser energy in a range between about 8 and about 10 mJ/pulse, resulting in an harmonic output energy in a range between about 1.0 and about 3.5 µJ, within a single resonant harmonic (RH) order.

The present method and system are thus shown to generate coherent radiation of intensity in a range between about $10^{14}$ and about $10^{15}$ W cm$^{-2}$, and wavelength typically below 100 nm, in a range between about 55 and about 59 nm for example, to be used as a seed for a free-electron laser (FEL) pushing capabilities towards the water-window.

The present system allows generating fs pulses, with a Fourier transform limited pulse duration in a range between about 6.0 and about 7.0 fs, of coherent extreme-ultraviolet (XUV) radiation of increased monochromaticity and intensity, without specialized X-ray mirrors or an X-ray grating monochromator.

There is thus presented a method and a system to generate intense, ultrashort pulses of XUV and soft X-ray radiation via high-order harmonic generation (HHG) with increased monochromaticity using resonant harmonics (RH) from laser-ablated plume (LAP). The method capitalizes on findings that the resonant enhancement factor of resonant harmonic (RH) increases drastically by using driving lasers with shorter wavelengths (400 nm driving laser pulses in experiments described herein with $Ga^+$, which is generated by performing the second harmonic generation (frequency doubling) of the 800 nm driving laser pulses using the BBO crystal 60, and hence halving the driving laser wavelength of the driving laser system. This results in a significant increase in the monochromaticity of the generated harmonics. The method also takes advantage of the increase in harmonic intensity with shorter driving laser wavelengths, an increase in harmonic intensity observed by 4.5 times when the driving laser wavelength is changed from 860 nm to a lower value of 400 nm. These two effects combined result in a high-order harmonic source with enhanced monochromaticity and extremely high intensity, in a range between about $10^{14}$ and about $10^{15} W\, cm^{-2}$, and conversion efficiency (CE) in a range between about $1.0\times10^{-4}$ and about $3.3\times10^{-4}$.

The resonant enhancement factor increased via a decrease in the driving laser wavelength may be applied to selected targets to obtain intense harmonics with potential in a range of applications. This includes the application of high photon flux short-wavelength extreme ultraviolet (XUV) and soft X-ray seed source for a free-electron laser (FEL) to boost its operation further down to the electromagnetic spectrum, with a particular focus on emission in the water-window region, finding applications in the imaging of biological materials in their natural hydrated state for example.

REFERENCES

1. Brabec, T. & Krausz, F. *Intense few-cycle laser fields: Frontiers of nonlinear optics*. Rev. Mod. Phys. 72, 545-591 (2000).
2. Lewenstein, M. & L'Huiffier, A. *Principles of Single Atom Physics: High-Order Harmonic Generation, Above-Threshold Ionization and Non-Sequential Ionization*. in 147-183 (Springer, New York, N.Y., 2008). doi:10.1007/978-0-387-34755-47
3. Ibrahim, H. et al. *Tabletop imaging of structural evolutions in chemical reactions demonstrated for the acetylene cation*. Nat. Commun. 5, 4422 (2014).
4. Kapteyn, H. C., Da Silva, L. B. & Falcone, R. W. *Short-wavelength lasers*. Proc. IEEE 80, 342-347 (1992).
5. Kelkensberg, F. et al. *Molecular Dissociative Ionization and Wave-Packet Dynamics Studied Using Two-Color XUV and IR Pump-Probe Spectroscopy*. Phys. Rev. Lett. 103, 123005 (2009).
6. Goulielmakis, E. et al. *Attosecond Control and Measurement: Lightwave Electronics*. Science 317, 769-775 (2007).
7. Hughey, L. R., Williams, R. T., Rife, J. C., Nagel, D. J. & Peckerar, M. C. *Instrumentation for XUV lithography at SURF-II*. Nucl. Instruments Methods Phys. Res. 195, 267-271(1982).
8. Rothhardt, J., Tadesse, G. K., Eschen, W. & Limped, J. *Table-top nanoscale coherent imaging with XUV light*. J. Opt. 20, 113001 (2018).
9. Damascelli, A. *Probing the Electronic Structure of Complex Systems by ARPES*. Phys. Scr. T109, 61 (2004).
10. He, Y. et al. *Invited Article: High resolution angle resolved photoemission with tabletop 11 eV laser*. Rev. Sci. Instrum. 87, 011301 (2016).
11. Schmidt, O. et al. *Time-resolved two photon photoemission electron microscopy*. Appl. Phys. B 74, 223-227 (2002).
12. Miao, J. et al. *High Resolution 3D X-Ray Diffraction Microscopy*. Phys. Rev. Lett. 89, 088303 (2002).
13. Thibault, P. et al. *High-resolution scanning x-ray diffraction microscopy*. Science 321, 379-382 (2008).
14. Winterfeldt, C., Spielmann, C. & Gerber, G. Colloquium: *Optimal control of high-harmonic generation*. Rev. Mod. Phys. 80, 117-140 (2008).
15. Corkum, P. B. *Plasma perspective on strong field multiphoton ionization*. Phys. Rev. Lett. 71, 1994-1997 (1993).
16. Seddon, E. A. et al. *Short-wavelength free-electron laser sources and science: a review*. Reports Prog. Phys. 80, 115901 (2017).
17. Schnürer, M. et al. *Absorption-Limited Generation of Coherent Ultrashort Soft-X-Ray Pulses*. Phys. Rev. Lett. 83, 722-725 (1999).
18. Seres, J. et al. *Source of coherent kiloelectronvolt X-rays*. Nature 433, 596-596 (2005).
19. Ditmire, T, Crane, J. K, Nguyen, H., DaSilva, L. B. & Perry, M. D. *Energy-yield and conversion-efficiency measurements of high-order harmonic radiation*. Phys. Rev. A 51, R902-R905 (1995).
20. Constant, E. et al. *Optimizing High Harmonic Generation in Absorbing Gases: Model and Experiment*. Phys. Rev. Lett. 82, 1668-1671 (1999).
21. Dachraoui, H. et al. *Interplay between absorption, dispersion and refraction in high-order harmonic generation*. J. Phys. B At. Mol. Opt. Phys. 42, 175402 (2009).
22. Seres, J. et al. *Coherent superposition of laser-driven soft-X-ray harmonics from successive sources*. Nat. Phys. 3, 878-883 (2007).
23. Paul, A. et al. *Quasi-phase-matched generation of coherent extreme-ultraviolet light*. Nature 421, 51-54 (2003).
24. Lambert, G. et al. *Injection of harmonics generated in gas in a free-electron laser providing intense and coherent extreme-ultraviolet light*. Nat. Phys. 4, 296-300 (2008).
25. De Stasio, G. et al. *Feasibility tests of transmission x-ray photoelectron emission microscopy of wet samples*. Rev. Sci. Instrum. 71, 11-14 (2000).
26. Lambert, G. et al. *Seed level requirement for improving the temporal coherence of a Free-Electron Laser*. EPL (Europhysics Lett. 88, 54002 (2009).
27. Ozaki, T., Ganeev, R., Suzuki, M. & Kuro, H. *High-Order Harmonic Generation from Low-Density Plasma*. in Advances in Solid State Lasers Development and Applications (In Tech, 2010). doi: 10.5772/7963
28. Ganeev, R. A. *Harmonic generation in laser-produced plasmas containing atoms, ions and clusters: a review*. J. Mod. Opt. 59, 409-439 (2012).
29. Suzuki, M., Baba, M., Ganeev, R., Kuroda, H. & Ozaki, T. *Anomalous enhancement of a single high-order harmonic by using a laser-ablation tin plume at 47 nm*. Opt. Lett. 31, 3306 (2006).

30. Ganeev, R. A., Suzuki, M., Baba, M., Kuroda, H. & Ozaki, T. *Strong resonance enhancement of a single harmonic generated in the extreme ultraviolet range*. Opt. Lett. 31, 1699 (2006).
31. Peart, B., Lyon, I. C. & Dolder, K. *Measurements of absolute photoionisation cross sections of $Ga^+$ and $Zn^+$ ions*. J. Phys. B At. Mol. Phys. 20, 5403-5410 (1987).
32. Zeitoun, P. et al. *A high-intensity highly coherent soft X-ray femtosecond laser seeded by a high harmonic beam*. Nature 431, 426-429 (2004).

The invention claimed is:

1. A high-order harmonic source of radiation, comprising:
a nonlinear solid target;
a laser source;
a beam splitter separating a beam from the laser source into a first beam line and a second beam line;
said first beam line comprising a first focusing unit directing a first, uncompressed, laser beam onto the nonlinear solid target, to generate a laser ablated plume; and
said second beam line directing a second, compressed and frequency-doubled laser beam, to the laser ablated plume, yielding high-order harmonic generation of radiation of photon energies in a range between 12 eV and 36 eV.

2. The high-order harmonic source of radiation of claim 1, wherein said laser source is of a wavelength selected to achieve a multiphoton resonance with a target resonant transition energy in the laser ablated plume for resonant harmonic generation.

3. The high-order harmonic source of radiation of claim 1, wherein the nonlinear solid target is one of: graphite, tin, indium, manganese, chromium, gallium, and antimony.

4. A system for generating radiation, comprising:
a nonlinear solid target;
a laser source of a wavelength selected to achieve a multiphoton resonance with a target resonant transition energy in said solid target for resonant harmonic generation;
a beam splitter separating a beam from the laser source into a first beam and a second beam;
a first focusing unit and a second focusing unit;
a compressor;
a frequency-doubling unit;
wherein the first beam is directed onto the nonlinear solid target by the first focusing unit, thereby generating a laser ablated plume; the compressor compresses pulses of the second beam and resulting compressed second beam pulses are directed by said second focusing unit to said frequency-doubling unit and to the laser ablated plume, yielding high-order harmonic generation of radiation of photon energies in a range between 12 eV and 36 eV.

5. The system of claim 4, wherein the nonlinear solid target is one of: graphite, tin, indium, manganese, chromium, gallium, and antimony.

6. The system of claim 4, wherein the frequency-doubling unit comprises a barium borate crystal.

7. The system of claim 4, wherein the nonlinear solid target is a gallium target; the laser source has a wavelength of 800 nm, a pulse duration in a range between 10 and 100 fs, and a laser repetition rate in a range between 10 and 100 Hz; the first beam has a pulse energy in a range between 1.0 and 2.0 mJ; the pulses of the second beam are compressed to a range between 45 and 60 fs and frequency-doubled at 400 nm; interaction of the compressed frequency-doubled second beam pulses with the gallium laser ablated plume generating the high-order harmonic spectrum from the gallium laser ablated plume, of an intensity in a range between $0.5 \times 10^{14}$ and $4.0 \times 10^{14}$ W $cm^{-2}$.

8. The system of claim 4, wherein the nonlinear solid target is a gallium target, the laser source is an amplified Ti:sapphire laser of wavelength 800 nm, 210 ps pulse duration; and a 10 Hz pulse repetition rate is selected; the first beam has a pulse energy in a range between 1.0 and 2.0 mJ and a 210 ps laser pulse duration; the compressed frequency-doubled second beam pulses have a pulse duration in a range between 45 and 60 fs and a wavelength of 400 nm; and the first beam is directed to the nonlinear solid target at an intensity in a range between $0.5 \times 10^{10}$ and $3.0 \times 10^{10}$ W $cm^{-2}$.

9. A method for generation of radiation via high-order harmonic generation, comprising:
selecting a nonlinear solid target and a laser source;
separating a beam from the laser source into a first laser beam and a second laser beam;
focusing the first laser beam onto the nonlinear solid target, thereby generating a laser ablated plume; and
compressing and frequency-doubling the second laser beam and directing a resulting second compressed and frequency-doubled laser beam to the laser ablated plume, thereby yielding high-order harmonic generation of radiation of photon energies in a range between 12 eV and 36 eV.

10. The method of claim 9, wherein said selecting the laser source comprises selecting a laser source of a wavelength to achieve a multiphoton resonance with a target resonant transition energy in the laser ablated plume for resonant harmonic generation.

11. The method of claim 9, comprising placing the nonlinear solid target in a vacuum; using a beam splitter to separate the beam from the laser source into the first laser beam and the second laser beam; using a barium borate crystal for frequency-doubling the second laser beam.

12. The method of claim 9, wherein the nonlinear solid target is one of: graphite, tin, indium, manganese, chromium, gallium, and antimony.

13. The method of claim 9, wherein the nonlinear solid target is a gallium target; the laser source has a wavelength of 800 nm, a pulse duration in a range between 10 and 100 fs, and a laser repetition rate in a range between 10 and 100 Hz; the first laser beam has a pulse energy in a range between 1.0 and 2.0 mJ; the pulses of the second beam are compressed to a range between 45 and 60 fs and frequency-doubled at 400 nm; and interaction of the compressed frequency-doubled second beam pulses with the gallium laser ablated plume generates the high-order harmonic spectrum from the gallium laser ablated plume, of an intensity in a range between $0.5 \times 10^{14}$ and $4.0 \times 10^{14}$ W $cm^{-2}$.

14. The method of claim 9, wherein the nonlinear solid target is a gallium target, the laser source is an amplified Ti:sapphire laser of wavelength 800 nm, 210 ps pulse duration; and a 10 Hz pulse repetition rate is selected; the first beam has a pulse energy in a range between 1.0 and 2.0 mJ and a 210 ps laser pulse duration; the compressed frequency-doubled second beam pulses have a pulse duration in a range between 45 and 60 fs and a wavelength of 400 nm; and the first beam is directed to the nonlinear solid target at an intensity in a range between $0.5 \times 10^{10}$ and $3.0 \times 10^{10}$ W $cm^{-2}$.

* * * * *